United States Patent

[11] 3,587,111

[72] Inventor Kenneth E. Prada
 Wareham, Mass.
[21] Appl. No. 20,959
[22] Filed Mar. 19, 1970
[45] Patented June 22, 1971
[73] Assignee The United States of America as represented by the Secretary of the Interior

[54] DIGITAL CORRELATION RECORDER
 9 Claims, 3 Drawing Figs.
[52] U.S. Cl. ................................................ 346/33 EC,
 346/101, 340/3 F
[51] Int. Cl. .................................................... G01d 9/38
[50] Field of Search .......................................... 346/33 R,
 33 EC, 23, 101; 340/3 F; 343/5 PC

[56] References Cited
UNITED STATES PATENTS
2,910,666 10/1959 Hardgrove et al. .......... 346/33 EC X Primary Examiner—Joseph W. Hartary
Attorneys—Ernest S. Cohen and Albert A. Kashinski ABSTRACT: Keying and recording functions in a correlation recorder are performed by digital circuitry. Each function is synchronized to the other by a precision clock generator. Among the functions controlled are: keying signals for initiating external events, printing of input signals representing external events, and record transport for proper positioning of the input signal on a permanent record with a precisely known time relationship to the keying signals. The time sequence of keying and recording functions is precisely adjustable over a wide range of settings.

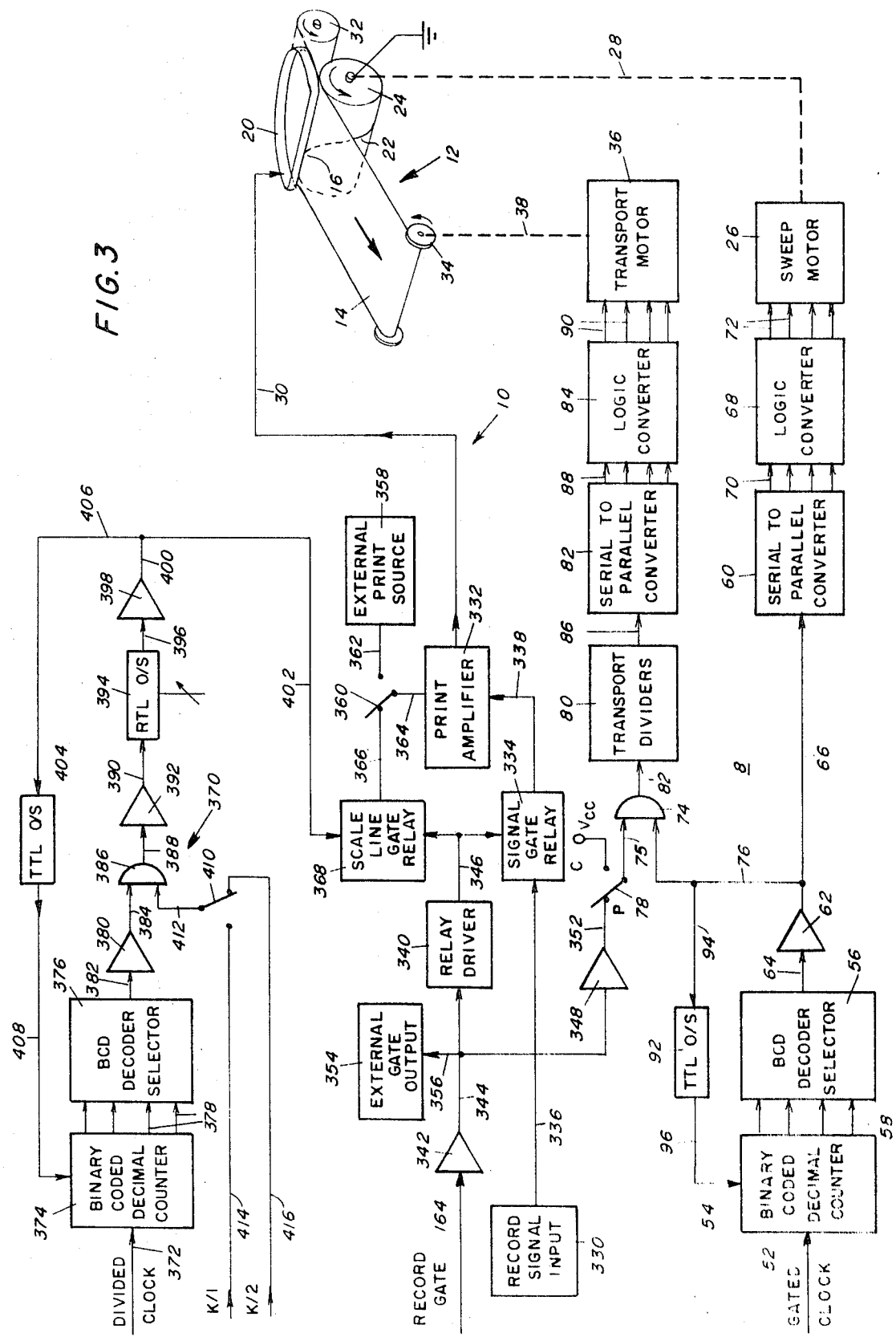

DIGITAL CORRELATION RECORDER

BACKGROUND OF THE INVENTION

Correlation recording is a process for visually displaying discrete, though related, information bits in a systematic pattern. In a commonly used correlation display format, marks representing numerous information bits from an input signal are printed upon a recording surface. Successive printed marks are spaced across the breadth and length of the surface. The resulting two-dimensional pattern visually represents the corelationship of the numerous bits. Because of this corelationship, the sequence of printing each mark must be precisely controlled. For this purpose, a precision correlation recorder is used.

In response to an input signal, a correlation recorder prints visually perceptible, accurately dimensioned marks at precise locations on a recording surface, such as a sheet of paper. Usually, the input signal is in the form of a pulse train or complex waveform generated by associated electronic equipment. Information bits are received by the recorder in rapid succession, so that accurate positioning of the representative marks depends upon rapid scanning of the recording sheet by a printing mechanism. The printer must scan the breadth and length of the sheet, marking appropriate positions in synchronized response to the input signal. Commercially available helix printers suitably fulfill these printing requirements of correlation recording.

One type of helix printer marks a strip of sensitized paper by ionic deposition. The paper passes between an oppositely polarized pair of aligned electrodes which intersect at a single point. One electrode is a thin, straight blade; the other is a helical wire. An input signal alters the potential difference between the electrodes, causing an ionic deposition from the electrode blade to mark the sensitized paper at the interception point of the blade and helix. For transverse sweeping of the interception point across the recording paper, the helix is rotated on a supporting drum. For longitudinal sweeping, the paper is transported on reels between the blade and helix.

One practical application of correlation recording is the measurement of acoustic travel time in water for bathymetric and seismic studies. In response to a keying signal, an acoustic wave is transmitted toward an underwater object. The wave is reflected by the object and returns to an electromechanical transducer. By measuring the travel time between transmission and reception of the reflected wave, the distance between the transmitter and object is determined. The physical nature of the object is indicated by the intensity of the reflected wave.

Bottom contours and large submerged objects are studied by continually transmitting acoustic waves from a moving vessel. As the reflected waves return, they are sequentially recorded in a systematic pattern, visually representing the shape and physical nature of the reflecting bottom surface or object. The accuracy of the recorded pattern depends upon precision sequencing of the events by which the pattern is generated. First, a keying signal initiates an acoustic wave. The time delay between transmission and reception of the wave is then established by precisely positioning a printed mark on a paper record when the reflected wave is received.

To conserve space on the paper and enhance resolution, a gated recording period is selected. The gate interrupts recording during a known portion of the wave travel time and eliminates spurious signals from the printed record. Scale lines are printed along with the acoustic signal to calibrate the recorded interval and aid visual interpretation. As the bathymetric or seismic study proceeds, acoustic waves are transmitted and received in continual succession, so that production of an accurate correlation record requires precision sequential control of the many interrelated keying signals, gating periods, calibration intervals, printing sweep, paper transport, and ultimately, the actual printing of information onto the paper recording strip.

DESCRIPTION OF THE PRIOR ART

Prior correlation recorders employ complex electromechanical systems for sequencing the numerous interrelated signals required for correlation recording. Systems of gears, shafts and cams are used for program control in these recorders, with the inherent difficulties of misalignment and poor repeatability. One such recorder is described in Woods Hole Oceanographic Institution Reference No. 60–38, titled *Instruction Manual for Precision Graphic Recorder (PRG)*, by S. T. Knott and W. E. Witzell. The digital correlation recorder of this invention eliminates the deficiencies of these prior art recorders by employing a novel arrangement of digital components, all synchronously controlled by a single precision clock generator.

SUMMARY OF THE INVENTION

This invention is a digital correlation recorder. All internal functions of the recorder are synchronized by a precision clock generator, or other time base. Precision clock pulses from the generator time the production of primary and auxiliary key pulses for initiating external events. After an appropriate interval, measured by counting clock pulses, a RECORD GATE is opened to receive and print external information signals. During the recording interval, the information is printed by a helix printer. Precision control of the helix printer is achieved by operating the printer sweep and transport motors in response to the precision pulses derived from the clock generator. Each of these functions is precisely synchronized to the other, resulting in an accurate and easily interpreted correlation recording.

While the separate functions of the digital correlation recorder are mutually synchronized, at the same time they are adjustable relative to one another. Adjustment is made by precise settings on binary coded decimal (BCD) decoding switches, rather than by cams and gears, as in the prior art, so that the synchronized relationships are easily maintained.

Therefore, one object of this invention is a digital circuit for controlling the functions required for correlation recording.

Another object of this invention is a digital correlation recorder in which correlation control functions are synchronized to a single precision time base.

Still another object of this invention is a digital correlation recorder in which correlation control functions are adjustably synchronized to a precision time base.

These and other objects of the invention will be apparent in the following specification and drawing in which:

BRIEF DESCRIPTION OF THE DRAWING

FIGS. 2 and 3 are a schematic diagram of a digital correlation recorder circuit, divided into two parts for convenience.

GENERAL DESCRIPTION OF THE PREFERRED EMBODIMENT

Figure 1:
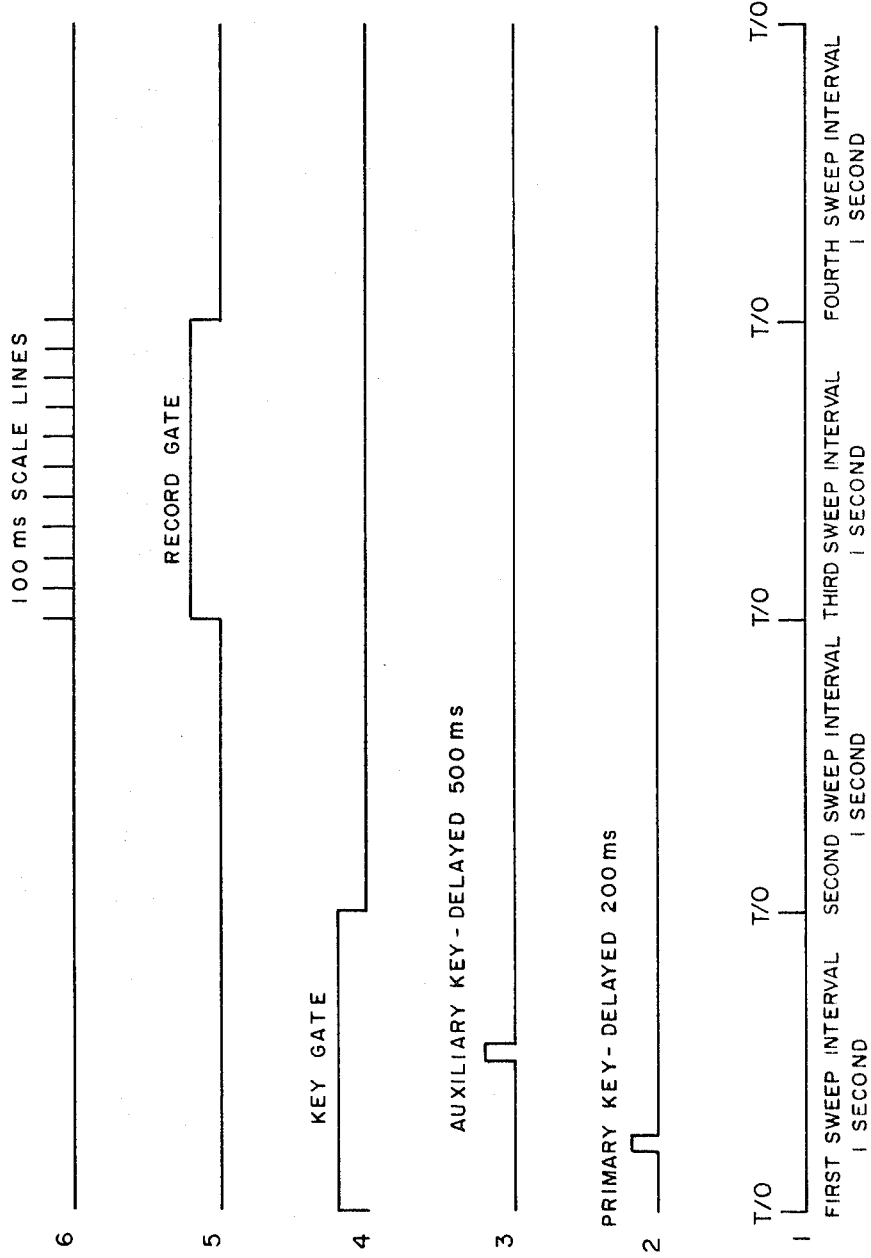
FIG. 1 is a linear graph representing the time sequence of several functions performed by a digital correlation recorder.

FIG. 1 is a linear graph representing a timed sequence of events. The events are controlled by a digital correlation recorder 10, shown in FIGS. 2 and 3. Line 1 of the graph is divided into four equal segments or sweep intervals. Each interval begins at a base time T/O, following the preceding interval without interruption. The length of each interval represents the sweep time of a printing helix 22, traveling across a sheet of paper 14 in a helix printer 12. Although the sweep interval of the digital correlation recorder is variable over a wide range, a 1 second interval is shown in FIG. 1 as an example.

On line 2 of FIG. 1 a KEY GATE period is represented by a positive pulse. The gate is shown as open during the first sweep interval, and closed during subsequent intervals. When the KEY GATE opens, a key pulse may be generated to perform a control function in the recorder, itself, or to initiate an external event. On line 3 a primary key pulse is shown during the KEY GATE period, delayed 200 milliseconds from the start of the first sweep interval of the helix printer 12. On line 4 an auxiliary pulse is shown, delayed 500 milliseconds. After the KEY GATE closes, no further key pulses are generated in a multisweep sequence.

When the digital correlation recorder is used, for example, to measure acoustic travel time, an acoustic wave is initiated during the gating period by the primary key pulse. Depending upon the distance between the acoustic wave transmitter and a reflecting object, a definite time period is required for transmission and return of the reflected wave to a receiving transducer. For an object far away from the transmitter, the times taken by a series of waves to travel to and from the object are disproportionately larger than travel time variations caused by dimensional irregularities of the object, itself. But these time variations are generally the critical feature of the recorded signal. If the entire travel time of each wave is confined to a single sweep interval, the critical portion of the record is ambiguously condensed. A RECORD GATE is, therefore, employed in the digital correlation recorder to improve the resolution of the recorded signal.

On line 5 of FIG. 1, a RECORD GATE is shown as a positive pulse spanning the entire third sweep interval of the helix printer 12. This gate is opened during any selected sweep interval after the key pulse is generated. During this interval the digital correlation recorder 10 accepts and records signals received at a record signal input 330. In the other sweep intervals the RECORD GATE is closed, and no signals are recorded, providing a precisely controlled delay period between the transmission and reception of the acoustic waves. Because the uninformative part of the record is eliminated and the critical portion of the wave travel time is distributed over an entire sweep interval, the resolution of the recorded signal is significantly increased. As sequential signals are received and printed by the recorder, any variations between them are readily apparent.

On line 6 of FIG. 1, scale line pulses evenly divide the third sweep interval. These scale line pulses are superimposed upon the recorded signal to precisely determine the travel time of the acoustic wave. Since the wave is initiated by the primary key pulse at a known time in a sweep interval, and since the length and number of intervening sweep intervals are known, the wave travel time to and from the reflecting object is determined by simply adding the durations of the known time intervals to the scaled time indication on the printed record.

Figure 2:
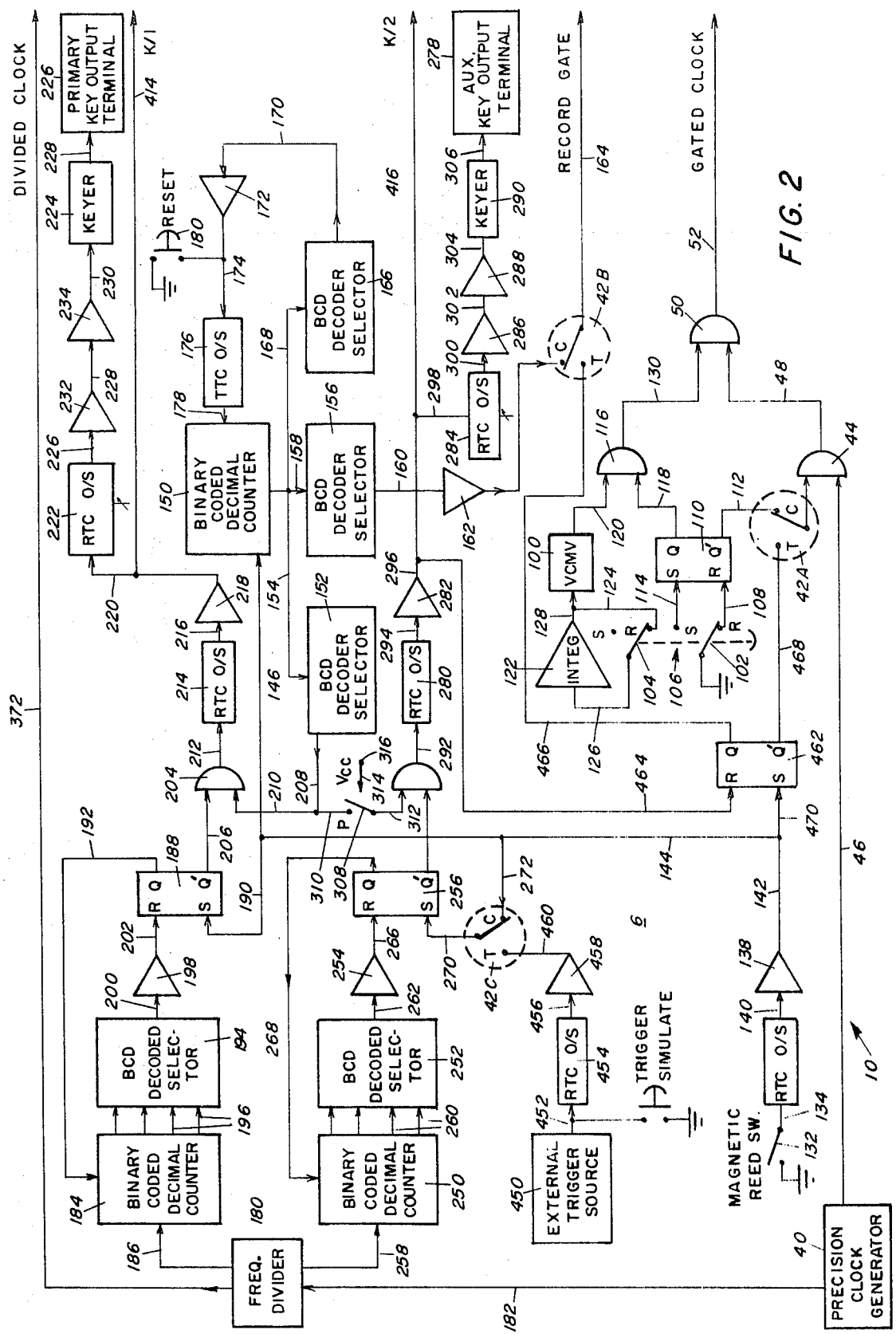

FIGS. 2 and 3 are a unitary logic diagram of a digital correlation recording circuit 10 for controlling the functions graphically represented in FIG. 1. Additional recording functions, other than those graphically represented, are also controlled by the circuit and described below. The logic diagram is divided into two separate parts for convenience, with appropriate interconnections noted by arrows in FIGS. 2 and 3. Although the circuit is divided primarily because of its size, the division helps to illustrate the function of the two separated circuit parts. In the following description FIG. 2 will be called the keying circuit 6, and FIG. 3 the recording circuit 8, corresponding with the general functions of the circuitry shown.

Outputs from the keying circuit 6 are positioned at the right edge of FIG. 2. Two external outputs—a primary key output 226 and an auxiliary key output 278—provide the keying pulses, shown on lines 3 and 4 of FIG. 1, to control peripheral electronic equipment associated with the correlation recorder. An internal RECORD GATE output 164 provides the record gate pulse shown on line 5 of FIG. 1. In addition, a gated clock signal, a lower frequency divided clock signal, and two internal control signals—K/1 and K/2—are generated as internal outputs by the keying circuit. Each of these outputs is synchronized to the other by a precision clock generator 40.

The internal outputs of the keying circuit 6 are fed as inputs to the recording circuit 8, as shown on the left edge of FIG. 3. In addition, a record signal input 330 is shown at the same location on the figure. The divided clock signal input activates a scale line generator 370 for producing scale line pulses, as shown on line 6 of FIG. 1. The K/1 and K/2 control pulses, which are derived from the primary and auxiliary key pulses, synchronize these scale line pulses with the key pulses. When a key pulse is produced by the keying circuit, the scale line generator is set to zero and a new series of scale line pulses initiated with a known relationship to the key pulse. By this correlation of key and scale line pulses, the elapsed time between production of a key pulse and recording of the input signal is easily measured. Printing of the scale lines and record signal, which originates at the record signal input 330, is controlled by the RECORD GATE input to the recording circuit 8. When the RECORD GATE is open, scale line and record signals are fed to a helix printer 12 and recorded on a sheet of paper 14, as previously described with reference to line 5 of FIG. 1. During the printing cycle, gated clock pulses from the keying circuit 6 activate paper transport and sweep motors 36 and 26 in the helix printer 12 to precisely position the recorded signal on the paper sheet.

SPECIFIC DESCRIPTION OF THE PREFERRED EMBODIMENT

In FIGS. 2 and 3 a digital correlation recorder 10 is shown. Visual readout from the recorder is produced by a helix printer 12, shown in FIG. 3. The printer marks an electrosensitive sheet of recording paper 14 by ionic deposition at the intersection point 16 of a pair of oppositely polarized electrodes. One electrode is a thin straight blade 20 aligned perpendicular to the edge of the recording paper 14. The other electrode is a helical wire 22, wound on a drum 24 aligned with, and below the electrode blade 20. Rotation of drum 24 in a counterclockwise direction, as shown by an arrow on the drum, shifts the intersection point of electrode blade 20 and helix 22 from right to left. In operation, drum 24 rotates at a high speed, powered by a digital stepping sweep motor 26 through a connecting linkage 28. The resulting high-speed helix rotation sweeps intersection point 16 across recording paper 14 at a sweep rate sufficient to clearly delineate closely spaced electronic impulses, fed to blade electrode 20 through an input lead 30.

While the rotating helix 22 is sweeping in a transverse direction, the paper 14 is simultaneously drawn between a pair of transport reels 32 and 34, spacing successively printed marks along the length of the paper. The reels are powered by a digital stepping transport motor 36 through a connecting linkage 38. Because helix sweep and paper transport occur simultaneously, the resulting printed record is skewed slightly on the paper. This slight inaccuracy could be corrected by skewing the electrode blade 20 in the opposite direction, but the skewed record is easily interpreted, making adjustment of the blade unnecessary.

Timing signals for controlling helix sweep and paper transport rates are generated by a precision clock generator 40, shown in FIG. 2. A solid-state crystal clock with a symmetrical square wave output compatible with TTL and RTL integrated circuit logic is suitable for this purpose. For controlling the high-speed sweep and transport circuits a frequency on the order of 500 kHz. is used in the preferred embodiment. This and other timing rates, however, may be varied to suit the particular application of the recorder.

Clock signals from generator 40 are delivered to helix printer 12 in one of two distinct operating modes, depending upon the position selected for a triple-pole, double-throw, mode switch 42. In the continuous (C) position of the switch the printer is driven continuously. In the triggered (T) position, printing is controlled by an external trigger source. In each case, internal operation of the sweep and transport motor control circuitry is essentially similar. In the following description, control of the sweep and transport motors 26 and 36 of helix printer 12 is first discussed for the continuous mode, with pole 42-A of mode switch 42 in the C position.

Clock signals from precision clock generator 40 arrive at one input of an AND gate 44 through a conductor 46. When the AND gate 44 is opened by a signal through mode switch 42–A, the gated clock signal cycles a four digit binary coded decimal (BCD) counter 54, traveling through a conductor 48, an OR gate 50, and another conductor 52, spanning FIGS. 2 and 3. Signals from BCD counter 54 control power input to the sweep and transport stepping motors 26 and 36 to step the motors at a precisely known rate. This rate is determined by the count set on an adjustable four digit BCD decoder 56, coupled to counter 54 by conductors 58. Gated clock signals are counted until BCD counter 54 reaches the count set on decoder 56. At this point, the decoder output changes state. This state change is coupled to a serial to parallel converter 60 through an inverter 62, and conductors 64—66. The serial to parallel converter 60 converts each serial state change input to two parallel offset square waves and their complements. These offset and complementary waveforms are necessary for the proper energization sequence of the four windings (not shown) of sweep motor 26. The square waves pass to sweep motor 26 through a logic converter 68 and conductors 70—72. In the logic converter, four high current switches (not shown) prefaced by four logic buffers (not shown), transform the transistor-transistor-logic (TTL) output of the serial to parallel converter 60 to voltage and current levels sufficient to energize the windings of sweep motor 26.

In addition to energizing the windings of sweep motor 26, the state change of BCD decoder 56 also energizes transport motor 36 and resets the BCD counter 54 for a new counting sequence. Operation of transport motor 36 is gated by an AND gate 74, coupled to the BCD decoder 56 through a conductor 76. The second input to AND gate 74 is derived, through a conductor 75, either from the record gate signal, shown on line 5 of FIG. 1, or from a continuous voltage input (Vcc). Selection of this second input is made by an SPDT switch 78. When switch 78 is in the programmed (P) position, paper transport in the printer 12 occurs only during recorded sweep intervals, that is, when the RECORD GATE is open. When switch 78 is in the continuous (C) position, paper transport occurs during every sweep interval of the printing helix 22, regardless of the state of the RECORD GATE.

The output of AND gate 74 activates a fixed divider network 80 through a conductor 82. This divider network generates six pulses for each 500 state changes of BCD decoder 56, activating transport motor 36 in a manner similar to operation of the sweep motor 26. In the transport motor circuit a serial to parallel converter 82, logic converter 84, and conductors 86—90 perform functions similar to their counterparts in the sweep motor circuit. The additional divider network in the transport circuit enables relatively slower operation of the transport motor, while maintaining a precisely synchronized relationship between the sweep and paper transport functions. When the count set on the BCD decoder 56 is adjusted to vary the stepping rate, the transport and sweep rates are adjusted proportionately, so that helix sweep and paper transport remain in synchronism.

Each state change of BCD decoder 56 is coupled to a TTL one-shot 92, through conductors 76 and 94, to reset counter 54 at the end of a counting cycle. The TTL one-shot generates a pulse, transmitted through a conductor 96, to reset BCD counter 54 to zero, beginning a new counting cycle. At the end of the new cycle, another state change occurs, resetting the counter in a continuous regenerative cycle.

If the stepping speed of sweep motor 26 is increased by adjusting the count set on adjustable BCD decoder 58, a critical speed is reached at which the pulse input rate to the serial to parallel converter 60 is too great for reliable motor starting. For stepping speeds beyond this critical speed, the sweep motor must be started at a low stepping rate and then accelerated to the final stepping rate. For this purpose, starting clock pulses are generated by a voltage controlled multivibrator (VCMV) 100, shown in FIG. 2. The VCMV is substituted for precision clock generator 40 as a source of clock pulses by moving the contacts 103 and 104 of a DPDT start/run switch 106 in an upward direction. In the run (R) position, contact 102 grounds a conductor 108 leading to a flip-flop 110. With contacts 102 in this position, no output appears at the Q terminal of the flip-flop, and a positive output appears at the Q' terminal. This positive output is transmitted, through a conductor 112, to the C terminal of mode switch 42–A, opening AND gate 44 for passing precision clock pulses to the printer control circuit.

When switch 106 is in the start (S) position, contact 102 grounds a conductor 114, shifting the positive output from the Q' to the Q terminal. This shift closes precision clock gate 44 and opens starting AND gate 116, connected to the flip-flop and one input terminal of the gate by a conductor 118. At the other input terminal of AND gate 116, the output of VCMV 100 is connected through a conductor 120. With switch 106 in the start position, contact 104 enables an integrator 122 by open circuiting conductors 124 and 126. Output from the integrator passes through a conductor 128 to VCMV 100, raising the VCMV output frequency as the integrator output voltage increases. Over a five second period the integrator output increases from zero to a steady state level. The VCMV output to AND gate 116 is 50kHz. at the zero output level of integrator 122, and 500kHz. at the steady state integrator output level. The gradually increasing clock signal is fed from AND gate 116 to BCD counter 54 by a conductor 130, OR gate 50 and conductor 52. When the VCMV output frequency has increased to the 500kHz. steady state level, switch 106 is moved to the run position, substituting the output of precision clock generator 40 for the VCMV output to run the sweep motor at a high stepping rate.

In the General Description of the Preferred Embodiment of digital correlation recorder 10, the sweep intervals shown on line 1 of FIG. 1 were related to the sweep time of the helix printer 12. A base time T/O was established as the starting point of each sweep interval for keying inter-related recording functions to a definite point in the sweep of printing helix 22. This T/O base time is established in the recorder by a magnetic reed switch 132. As the printing helix 22 rotates, magnetic coupling periodically occurs between switch 132 and a magnet (not shown) fixed to the helix mounting drum 24. Each time the helix passes the zero position on recording paper 14, switch 132 closes, connecting a resistor-transistor-logic (RTL) one-shot 136 to ground, through a conductor 134. The one-shot emits a short pulse to an inverter 138 through a conductor 140. From the amplifier, the T/O pulse output passes to a conductor 142 for internal distribution to synchronize recorder control functions to the precise position of the printing helix.

One control function performed by the T/O pulse output is indexing of the key and record gates to the starting points of specific sweep intervals, as shown on lines 2 and 5 of FIG. 1. For this purpose, each T/O pulse travels through conductors 142—146 to a two digit BCD counter 150 in a programming section of the recorder 10. BCD counter 150 is clocked by the T/O pulses, advancing one count at the start of each helix sweep. The KEY GATE signal is produced by a BCD decoder 152 joined to counter 150 by a conductor 154. Decoder 152 is set to decode '0,' and generates the KEY GATE during the fist sweep of a multisweep sequence. A second, two digit BCD decoder 156, connected to BCD counter 150 by a conductor 158, generates the RECORD at a selected sweep interval in a multisweep sequence. During this interval any information input to the recorder 10 is displayed by the helix printer 10. The recorded sweep interval is selected by the count set on decoder 156. For the sweep sequence shown in FIG. 1, the RECORD GATE is generated during the third sweep interval by a state change of decoder 156 after the second T/O pulse of the sweep sequence. The RECORD GATE signal passes through a conductor 160 to an amplifier 162 and then to the C contact terminal of level 42–B of mode switch 42. From the mode switch a conductor 164 carries the RECORD GATE signal to the recording circuit of FIG. 2. After the next T/O pulse the RECORD GATE closes for the remainder of the sweep sequence.

The length of a sweep sequence is determined by the count set on a third, two digit BCD decoder 166 in the programming section. The third decoder 166 receives the T/O pulse count from BCD counter 150 through a conductor 168, changing state when the count set in the decoder is reached. After the state change, a signal is transmitted by a conductor 170 to an inverter 172, then through a conductor 174 to a TTL one-shot 176. The one-shot 176 resets BCD counter 150 by transmitting a short pulse through a conductor 178 in response to the inverted decoder signal. Alternately, BCD counter 150 can be reset and a new sweep sequence begun by manually closing a reset switch 180 to momentarily connect the input of TTL one-shot 176 to ground. After being reset by either device, the count on BCD decoder 150 is '0' until the end of the next sweep interval. As explained above, the '0' count causes decoder 152 to generate a KEY GATE signal during this first sweep interval as the new sweep sequence begins.

On line 3 of FIG. 1, as has been described above, a primary key pulse is shown, delayed 200 milliseconds from the T/O point of the first sweep interval. The key pulse initiates an external event, the effects of which are then displayed by the printer 12. In order to measure the precise duration between the key signal and any effects generated by it, the signal must occur at a precisely known time in a sweep interval. In order to correlate a sequence of effects generated by sequential key signals, the sequential signals must each be generated at the same time relative to the base times of distinct sweep intervals. Since, for different external conditions, the elapsed time between the cause and effects of the external event is variable, an adjustment of the relative position of the key signal in a sweep interval is necessary to properly position the printed record on the recording paper. Each of these functions is performed by a primary key circuit in the recorder 10.

Basically, the primary key circuit, in response to clock pulses from precision clock generator 40, measures elapsed time after the T/O pulse in a sweep interval, and, for every such interval in which the KEY GATE is open, delivers a key pulse to a primary key output terminal 226. As an input to the primary key circuit, high frequency (500 kHz.) precision clock pulses are reduced by a frequency divider 180 to a lower frequency (1 kHz.) suitable for timing key pulses. After traveling from the clock generator through a conductor 182, the divided clock pulses are sent to a four digit BCD counter 184 through a conductor 186.

Counting action in counter 184 is controlled by a flip-flop 188 in response to the T/O pulses generated at the start of each sweep interval. When a T/O pulse is applied to terminal S of flip-flop 188 through a conductor 190, the Q output terminal of the flip-flop changes state. This state change is applied, through a conductor 192, to initiate counting action in BCD counter 184. In this way, counting action for delay of the primary key begins precisely at the T/O point in each sweep interval. Counter 184 counts the divided clock input until it reaches the count set on an adjustable BCD decoder 194, joined to the counter by conductors 196. At the end of a count cycle, determined by the setting on the decoder, the decoder output changes state. This state change is applied to the R terminal of flip-flop 188 through an inverter 198, and conductors 200 and 202. The state change resets the flip-flop 188, resets and stops the counter 184, and, through a conductor 206, applies a state change to one terminal of an AND gate 204.

And gate 204 operates as the primary key gate, opening during an appropriate interval in the sweep sequence in response to a KEY GATE signal from BCD decoder 152. During this sweep interval the KEY GATE signal from decoder 152 is applied to AND gate 204 through conductors 208 and 210. When the KEY GATE and key signals appear simultaneously, the output of AND gate 204 passes through a conductor 212 to initiate a short pulse from an RTL one-shot 214. Through a conductor 216, the pulse passes to an inverter 218 where it is inverted for input, through a conductor 220, to an adjustable RTL one-shot 222. Inversion of the pulse is necessary for proper interface between the fixed and adjustable one-shots 214 and 222. An adjustable, rather than a fixed, one-shot 222 is used to condition the key pulse width to the diverse requirements of external circuits to which the pulse might be fed as an input. The adjusted key pulse is applied to a keyer 224 through conductors 226—230, and buffers 232 and 234. The ultimate keyer output to the primary key output terminal 226 is derived, through a conductor 228, from an NPN semiconductor ground sink (not shown). Any suitable system (not shown) for initiating an external event is connected to the primary key output terminal 226. During the gating period (generally the first sweep interval) the primary key gate 204 is open, and an external event is triggered. During all other intervals in a sweep sequence the key gate 204 is closed, and no gating signal appears at the primary key output even through key signals continue to arrive at the key signal input through conductor 206.

The auxiliary key pulse, shown on line 4 of FIG. 1, is produced by a circuit similar to the primary key circuit. The auxiliary key circuit is shown in FIG. 2. A divided clock signal from frequency divider 180 cycles a four digit BCD counter 250, decoder 252, inverter 254 and flip-flop 256, each of which operates in the same way as the corresponding element in the primary key circuit. Connection of these elements to one another is made through conductors 258—268. Connection of the T/O timing pulse to the S terminal of flip-flop 256 is made by conductors 270 and 272 through an intermediate C terminal of pole 42–C of mode switch 42. In the continuous sweep mode of recorder 10 a state change appears at terminal Q' of flip-flop 256 a precisely timed duration after the T/O point in a sweep interval. The state change is transmitted to an auxiliary key AND gate 274 through a conductor 276. When a gating signal appears simultaneously with the key pulse at auxiliary key gate 274, the key pulse is transmitted to an auxiliary key output terminal 278 through an intermediate RTL one-shot 280, an inverter 282, an adjustable RTL one-shot 284, buffers 286—288, a keyer 290, and interconnecting conductors 292—306, each operating in the same way as the corresponding elements of the primary key circuit.

In the auxiliary key circuit a choice of gating signals is available through an SPDT switch 208. In the programmed (P) position of the switch a gating signal is derived from BCD decoder 152, through conductors 310 and 312, during a selected interval in a sweep sequence. In the continuous (C) position of switch 308, key gate 274 is connected, through a conductor 314, to a continuous voltage source (Vcc) 316. The continuous voltage input opens gate 274 during all intervals in a sweep sequence. As a result, the auxiliary key pulse is available for control purposes at a precise point within any and all sweep intervals.

Some time after a key signal from either key output 226 or 278 triggers an external event, the effects of that event are transmitted as an electrical impulse, from an external transducer for example, to a record signal input 330, shown in the recording circuit of FIG. 3. The record signal is fed to a print amplifier 332, through an intermediate record signal relay 334 and conductors 336—338. When the record signal relay is closed, the record signal is amplified and transmitted, through conductor 30, for display by the helix printer 12. Record signal relay 334 is actuated by a relay driver 340 in response to the RECORD GATE signal, fed into the recording circuit from the keying circuit through conductor 164. The RECORD GATE signal is inverted by an inverter 342 for energizing relay driver 340, and transmitted to the driver through a conductor 344. A relay linkage 346 closes the record signal relay in response to a RECORD GATE signal, opening the relay when the signal ceases and eliminating unwanted information from the printed record.

In addition to controlling information input to the printed record. the modified RECORD GATE signal is used to gate the transport motor 36 of the helix printer 12 in the programmed mode of printer operation. With SPDT switch 78 in the programmed (P) position the inverted RECORD GATE signal is fed to AND gate 74 through an inverter 348, and conductors 350—352. As explained above, AND gate 74 controls the operation of transport motor 36. When the RECORD GATE signal is used to control gate 74, paper transport occurs only during recorded sweep intervals, or when the record signal relay 334 is closed. For external control of peripheral equipment, the RECORD GATE signal is also fed to an external gate output terminal 354 by a conductor 356.

For many purposes it is convenient to superimpose related information upon the record signal displayed by the helix printer 12. Often information from an external source is required. For this purpose an external print source terminal 358 is connected to print amplifier 332 by one terminal of an SPDT switch 360 and conductors 362—364. Alternatively, switch 360 joins print amplifier 332 to the output conductor 366 of a scale line relay 368 for superimposing scale lines upon the printed record, as shown on line 6 of FIG. 1.

Scale line pulses are produced in the recording circuit of FIG. 3 by a scale line generator circuit 370. Divided (1 kHz.) clock pulses from frequency divider 180, shown in FIG. 2 are fed through a conductor 372 to a four digit BCD counter 374 in the generator circuit. The BCD counter counts clock pulses until reaching the count set in an adjustable BCD decoder 376 connected to the counter by conductors 378. The count set in decoder 376 determines the duration between scale line pulses. When this count is reached by the counter 374, the decoder changes state. This state change is coupled, through an inverter 380 and conductors 382—384, to one terminal of an OR gate 386. The signal output from OR gate 346 passes through conductors 388—390 and inverter 392 to an adjustable RTL one-shot 394. The adjustable one-shot 394 varies the width of scale line pulses recorded by helix printer 12. From the RTL one-shot, scale line pulses pass through a conductor 396 to an inverter 398, and then to the scale line relay 368 through conductors 400—402. From the scale line relay the pulses pass to the print amplifier 332 where they are available for recording by printer 12.

Each time a scale line pulse is produced by adjustable RTL one-shot 394, BCD counter 374 is reset. For this purpose a TTL one-shot 404 is connected, by conductors 406—408, from the output of inverter 398 to the BCD counter 374. TTL one-shot 404, in response to a scale line pulse, produces a pulse suitable for resetting BCD counter 374. In this way a new precision counting cycle is begun after the production of each scale line pulse.

In order to synchronize the production of scale line pulses to a precisely known relationship with the position of printing helix 22, an internal key pulse is used to reset scale line generator 370 at a precise point in a sweep interval. The internal key pulse arrives at OR gate 386 through an SPDT switch 410 and conductor 412, operating in the same way as a state change of BCD decoder 376 to trigger a scale line pulse and reset BCD counter 374. Since elapsed time measurement is generally referenced to the production of a primary or auxiliary key pulse, the interval key pulses for resetting the scale line generator are conveniently derived from the primary and auxiliary key circuits. A primary internal key signal (K/1) is tapped, by a conductor 414, from conductor 220, intermediate inverter 218 and adjustable one-shot 222. An auxiliary internal key signal (K/2) is tapped, by a conductor 416, from the intersection of conductor 296 and 298 at a corresponding location in the auxiliary key circuit. Either of these internal key pulses is available for synchronizing the scale line generator circuit 370 by manually moving switch 410 into contact with either conductor 414 or 416.

In the preceding description, operation of correlation recorder 10 in the continuous sweep mode was assumed, with mode switch 42 in the continuous (C) position. For some purposes, operation of the correlation recorder in a triggered sweep mode is preferably. A change from the continuous to the triggered sweep mode is made by simultaneously moving the three poles (A—C) of switch 42 from the C to the T contact position. In the triggered mode position of pole 42-C an external trigger source 450 is substituted for the T/O pulse input to the S terminal of flip-flop 256. As a result, auxiliary key pulses bear a direct time relation to the external trigger signal, rather than to T/O pulses produced at the beginning of each sweep interval. Signals from external trigger source 450 trigger an RTL one-shot 454 through a conductor 452. Trigger pulses from the one-shot 454 then pass through a conductor 456 to an amplifier 458 where they are modified for input, through conductors 460 and 270, to the S terminal of flip-flop 256. When a pulse appears at the S terminal of flip-FLOP 256 a counting cycle of BCD counter is initiated, and an auxiliary key pulse produced in the same way as in the continuous sweep mode. Sweep of helix printer 12 in the triggered sweep mode is controlled by this auxiliary key pulse.

When an internal auxiliary key pulse K/2 appears at conductor 296 in FIG. 2, a flip-flop 462 is reset by the pulse, acting through a conductor 464. In the reset state complementary signals appear at the Q and Q' terminals of flip-flop 462. From the Q output terminal of the flip-flop, a conductor 466 leads to the T terminal of level 42-B of mode switch 42. When switch 42 is in the triggered mode position the Q terminal of flip-flop 462 is connected to conductor 164, which, as was explained above, provides the RECORD GATE signal to the recording circuit of FIG. 3. The output of terminal Q' of flip-flop 462 is connected, through a conductor 468, to the T terminal of pole 42-A of mode switch 42. When an auxiliary internal key pulse K/2 resets flip-flop 462, the Q' output opens AND gate 44 for transmission of precision clock pulses. As long as a signal appears at the Q' terminal, the gate remains open and precision clock pulses continue to control sweep and transport motor operation.

In the triggered sweep mode, the RECORD GATE and gated-clock signals are distributed to the recording circuit for only a single selected sweep interval after the initiating trigger pulse. At the end of the selected sweep interval a T/O pulse is applied, through a conductor 470, to the S terminal of flip-flop 462. The T/O pulse sets flip-flop 462, inverting the output signals from the Q and Q' terminals. The RECORD GATE signal ceases, and AND gate 44 closes, turning off the sweep and transport motors. When a new external trigger signal is generated by source 450, flip-flop 462 is reset after a measured delay, and the above cycle is repeated.

For operation in either the continuous or triggered modes, the digital correlation recorder 10 offers a degree of precision previously unavailable in correlation recording. Although a specific circuit arrangement is shown and described, modifications within the scope of this invention will be apparent to those of ordinary skill in the art. As an example, the primary key output might be used directly as an external trigger source in the triggered mode of operation. In addition, the terms "primary" and "auxiliary" are applied to the keying circuits for reference only, as each circuit is interchangeable with the other in many applications. In view of the many obvious modifications of this type that might be made, the invention is limited only by the scope of the following claims:

I claim:

1. A correlation recorder comprising:
    a source of positive clock pulses,
    a printer having digitally operated sweep and transport motors for driving printing sweep and paper transport means, and having printing means for printing record signals received by the recorder,
    first counting means for counting the precision clock pulses and for producing a sweep signal each time a first predetermined number of pulses is counted,
    first signal conversion means for converting the sweep signal to a form suitable for operating the sweep motor,
    second signal conversion means for converting the sweep signal to a form suitable for operating the transport motor at a rate proportional to that of the sweep motor,
    transport gating means for gating the sweep signal input to the second signal conversion means, so that transport motor operation occurs only for selected intervals of the sweep signal, second counting means for counting the precision clock pulses and producing a primary key signal each time a second predetermined number of pulses is counted, primary key gating means for gating the primary key signal to transmit only selected occurrences of the primary key signal to a primary key signal output terminal, record gating means for controlling passage of a record signal from a record signal input terminal to the printing means of the printer, printer indexing means for producing a first reference signal each time a predetermined point in relation to a sweep interval of the printer is reached, third counting means for counting the first reference signals and producing a primary key gating signal for opening the primary key gating means, and for producing a record gating signal for opening the record gating means, both the primary key and record gating signals occurring during sweep intervals predetermined by the third counting means.

2. A correlation recorder as claimed in claim 1 in which:

counting action in the second means for counting is started from a base count in response to the first reference signal, and the second means for counting is reset to the base count each time a primary key signal is produced.

3. A correlation recorder as claimed in claim 1 predetermined sweep variable the first and second predetermined number of pulses, and the predetermine sweep intervals are variable by adjustment of the first, second, and third counting means, respectively.

4. A correlation recorder as claimed in claim 2 in which:

the first and second predetermined numbers of pulses, and the predetermined sweep intervals are variable by adjustment of the first, second, and third counting means, respectively.

5. A correlation recorder as claimed in claim 1, further comprising:

fourth counting means for counting the precision clock pulses and producing an auxiliary key signal each time a third predetermined number of pulses is counted, counting action in the fourth means for counting starting from a base count in response to a second reference signal, the fourth means for counting being reset to the base count each time an auxiliary key signal is produced, auxiliary key gating means for gating the auxiliary key signal to transmit only selected occurrences of the auxiliary key signal to an auxiliary key signal output terminal, and means for producing a key gating signal for opening the auxiliary key gating means during selected sweep intervals of the printer.

6. A correlation recorder as claimed in claim 4, further comprising:

fourth counting means for counting the precision clock pulses and producing an auxiliary key signal each time a third predetermined number of pulses is counted, counting action in the fourth means for counting starting from a base count in response to a second reference signal, the fourth means for counting being reset to the base count each time an auxiliary key signal is produced, auxiliary key gating means for gating the auxiliary key signal to transmit only selected occurrences of the auxiliary key signal to an auxiliary key signal output terminal, and means for producing a key gating signal for opening the auxiliary key gating means during selected sweep intervals of the printer.

7. A correlation recorder as claimed in claim 6 in which:

the second reference signal is identical with the first reference signal.

8. A correlation recorder as claimed in claim 6 in which:

the second reference signal is produced by an external source.

9. A correlation recorder comprising:

a source of positive clock pulses, a printer having digitally operated sweep and transport motors for driving printing sweep and paper transport means, and having printing means for printing record signals received by the recorder, first counting means for counting the precision clock pulses and for producing a sweep signal each time a first predetermined number of pulses is counted, first signal conversion means for converting the sweep signal to a form suitable for operating the sweep motor, second signal conversion means for converting the sweep signal to a form suitable for operating the transport motor at a rate proportional to that of the sweep motor, transport gating means for gating the sweep signal input to the second signal conversion means, so that transport motor operation occurs only for selected intervals of the sweep signal, second counting means for counting the precision clock pulses and producing a key signal each time a second predetermined number of pulses is counted, key gating means for gating the key signal to transmit only selected occurrences of the key signal to a key signal output terminal, means for producing a key gating signal for opening the key gating means during selected sweep intervals of the printer, record gating means for controlling passage of a record signal from a record signal input terminal to the printing means of the printer, printer indexing means for producing a first reference signal each time a predetermined point in relation to a sweep interval of the printer is reached, an external source for producing a second reference signal, counting action in the second means for counting starting from a base count in response to the second reference signal, the second means for counting being reset to the base count each time a key signal is produced, printer gating means for gating the precision clock pulse input to the first counting means, and printer control means for opening the printer gating means and record gating means in response to a key signal, and for closing the printer gating means and record gating means in response to the first reference signal.